(12) United States Patent
Kern et al.

(10) Patent No.: US 6,484,187 B1
(45) Date of Patent: Nov. 19, 2002

(54) COORDINATING REMOTE COPY STATUS CHANGES ACROSS MULTIPLE LOGICAL SESSIONS TO MAINTAIN CONSISTENCY

(75) Inventors: Ronald Maynard Kern, Tucson, AZ (US); Gregory Edward McBride, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,864

(22) Filed: Apr. 28, 2000

(51) Int. Cl.[7] .............................................. G06F 17/30
(52) U.S. Cl. ...................... 707/204; 707/10; 707/200; 707/201
(58) Field of Search ............................... 707/200, 201, 707/202, 203, 204, 1, 2, 8, 10; 709/105; 713/176, 201; 714/5, 21

(56) References Cited

U.S. PATENT DOCUMENTS

| | | | | |
|---|---|---|---|---|
| 4,751,635 A | * | 6/1988 | Kret ............................. | 707/10 |
| 4,926,414 A | | 5/1990 | Baratz et al. ................ | 370/225 |
| 5,043,871 A | * | 8/1991 | Nishigaki et al. ........... | 707/202 |

(List continued on next page.)

FOREIGN PATENT DOCUMENTS

| WO | WO 98/54662 | * 12/1998 | ........... G06F/17/30 |
|---|---|---|---|

OTHER PUBLICATIONS

Wolfson, Ouri et al., "Distributed Algorithms For Dynamic Replication of Data," Proceedings of the 11th ACM—SIGMOD—Symposium on Principles of Database Systems, pp. 149–163.*

U.S. Patent application entitled "Method, System, and Program for Maintaining Data Consistency Across Groups of Storage Areas," R. M. Kern, G. McBride and D. M. Shackelford, Filing date: Oct. 21, 1999, Serial #09/422,595.

IBM publication "Remote Copy: Administrator's Guide and Reference," IBM document SC35–0 169–02 (IBM Copyright 1994, 1996).

IBM publication "Planning for IBM Remote Copy," IBM document SG24–2595–00 (Copyright IBM Corp., 1995).

(List continued on next page.)

*Primary Examiner*—Jean M. Corrielus
*Assistant Examiner*—Shahid Alam
(74) *Attorney, Agent, or Firm*—Don Hubert & Assoc.

(57) ABSTRACT

A multi-session data storage facility coordinates similar status changes across all sessions at appropriate times. In each session, a data mover implements data mirroring by copying updates from the primary storage to the secondary storage. A master data set, accessible by all sessions, includes a common area for posting commands and/or errors to all sessions and individual session areas for posting errors occurring in particular sessions. When a data mover receives a host initiated command, this data mover becomes a "master." Initially, the master data mover lists the command in the master data set's common area. Whenever other, "slave" data movers notice a command in the master data set's common area, they respond by suspending their formation of consistency groups and responding with a "ready" message. The "ready" message comprises the slave data mover's consistency form time (i.e., the earliest of most-recent update time from all controllers in that session). Accordingly, after posting the command, the master data mover reviews the slave data movers' responses. If these responses indicate all sessions can execute the command at a requested consistent time, then the master data mover instructs the slave data movers to execute the command by entering an execute instruction in the master data set's common area. Otherwise, the master data mover enters a cancel operation in the master data set's common area.

24 Claims, 6 Drawing Sheets

U.S. PATENT DOCUMENTS

| | | | |
|---|---|---|---|
| 5,504,861 A | | 4/1996 | Crockett et al. .............. 714/13 |
| 5,537,533 A | | 7/1996 | Staheili et al. ................. 714/5 |
| 5,572,709 A | * | 11/1996 | Fowler et al. ................ 703/27 |
| 5,574,898 A | * | 11/1996 | Leblang et al. ................ 707/1 |
| 5,615,329 A | | 3/1997 | Kern et al. .................... 714/6 |
| 5,640,580 A | | 6/1997 | Slayden et al. ............. 707/527 |
| 5,649,200 A | * | 7/1997 | Leblang et al. ............ 707/203 |
| 5,675,802 A | * | 10/1997 | Allen et al. ................. 707/203 |
| 5,680,580 A | | 10/1997 | Beardsley et al. ............. 714/6 |
| 5,684,984 A | | 11/1997 | Jones et al. ................. 707/10 |
| 5,694,595 A | | 12/1997 | Jacobs et al. ................. 707/9 |
| 5,734,818 A | | 3/1998 | Kern et al. .................. 714/20 |
| 5,754,782 A | * | 5/1998 | Masada ..................... 707/102 |
| 5,758,359 A | * | 5/1998 | Saxon ........................ 707/204 |
| 5,764,972 A | * | 6/1998 | Crouse et al. ................. 707/1 |
| 5,794,563 A | * | 8/1998 | Klepac .................... 119/51.11 |
| 5,878,408 A | * | 3/1999 | Van Huben et al. ............ 707/1 |
| 5,931,947 A | * | 8/1999 | Burns et al. ................ 713/201 |
| 5,937,414 A | | 8/1999 | Souder et al. .............. 707/203 |
| 5,944,794 A | | 8/1999 | Okamoto et al. ........... 709/225 |
| 5,951,694 A | | 9/1999 | Choquier et al. ............. 714/15 |
| 5,991,772 A | * | 11/1999 | Doherty et al. ................. 707/1 |
| 5,999,947 A | * | 12/1999 | Zollinger et al. ............... 707/1 |
| 6,000,020 A | * | 12/1999 | Chin et al. ................... 370/401 |
| 6,023,709 A | * | 2/2000 | Anglin et al. .................. 707/2 |
| 6,023,710 A | * | 2/2000 | Steiner et al. .............. 707/204 |
| 6,038,665 A | * | 3/2000 | Bolt et al. .................. 707/204 |
| 6,044,367 A | * | 3/2000 | Wolff ............................ 707/1 |
| 6,052,695 A | * | 4/2000 | Abe et al. ................... 707/201 |
| 6,085,018 A | * | 5/2000 | Beier et al. ................. 707/201 |
| 6,088,694 A | * | 7/2000 | Burns et al. .................. 707/10 |
| 6,185,601 B1 | * | 2/2001 | Wolff ........................ 709/105 |
| 6,189,016 B1 | * | 2/2001 | Cabrera et al. ............. 707/201 |
| 6,199,074 B1 | * | 3/2001 | Kern et al. .................. 707/200 |
| 6,205,450 B1 | * | 3/2001 | Kanome ..................... 707/203 |
| 6,216,051 B1 | * | 4/2001 | Hager et al. ................ 700/121 |
| 6,240,527 B1 | * | 5/2001 | Schneider et al. ............ 714/21 |
| 6,269,381 B1 | * | 7/2001 | St. Pierre et al. ............... 707/1 |
| 6,269,431 B1 | * | 7/2001 | Dunham ..................... 707/204 |
| 6,289,383 B1 | * | 9/2001 | Rhine .......................... 707/10 |
| 6,332,140 B1 | * | 12/2001 | Rhine .......................... 707/10 |

\* cited by examiner

COORDINATING REMOTE COPY STATUS CHANGES ACROSS MULTIPLE LOGICAL SESSIONS TO MAINTAIN CONSISTENCY

BACKGROUND OF THE INVENTION

1. Field of the Invention

The present invention relates to a system, method, and program for ensuring data consistency across different storage areas and, in particular, coordinating similar status changes across multiple logical sessions at the appropriate consistency time.

2. Description of the Related Art

Disaster recovery systems typically address two types of failures, a sudden catastrophic failure at a single point in time or data loss over a period of time. With the gradual type of disaster, updates to volumes may be lost. To assist in recovery of data updates, a copy of data may be provided at a remote location. Such "dual" or "shadow" copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC).

These system recover data updates between a last, safe backup and a system failure. Such data shadowing systems can also provide an additional remote copy for non-recovery purposes, such as local access at a remote site. The XRC and PPRC systems are described in IBM publication "Remote Copy: Administrator's Guide and Reference," IBM document SC35-0 169-02 (IBM Copyright 1994, 1996), which publication is incorporated herein by reference in its entirety. In such backup systems, data is maintained in "volume pairs". A volume pair is comprised of a volume in a primary storage device and a corresponding volume in a secondary storage device that includes an identical copy of the data maintained in the primary volume. Typically, the primary volume will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the IBM XRC environment, the application system writing data to the primary volumes includes a sysplex timer which provides a time-of-day (TOD) value to time stamp data writes. The application system time stamps data sets when writing such data sets to volumes in the primary DASD. The integrity of data updates depends upon performing updates at the secondary volumes in the same order as they were done at the corresponding primary volume. In systems such as XRC, the time stamp provided by the application program determines the logical sequence of data updates. In many application programs, such as database systems, certain write operations cannot occur unless a previous write operation has already occurred; otherwise the data integrity is jeopardized. A data write whose integrity depends on the occurrence of previous data writes is a "dependent write". For instance, if a customer opens an account, deposits $400, and then withdraws $300, the withdrawal update to the system is dependent on the occurrence of the other writes, including the opening of the account and the $400 deposit. When such dependent transactions are copied from the primary volumes to secondary volumes, the transaction order must be maintained to preserve the integrity of dependent write operations.

Volumes in the primary and secondary DASDs are "consistent" when all writes have been transferred in their logical order, i.e., all earlier writes transferred first before their corresponding dependent writes. In the banking example, this means that the $400 deposit is written to the secondary volume before the $300 withdrawal. A "consistency group" is a collection of updates to the primary volumes such that dependent writes are secured in a consistent manner. In the banking example, this means that the withdrawal transaction is in the same consistency group as the deposit or in a later group; the withdrawal cannot be in an earlier consistency group. Consistency groups maintain data consistency across volumes and storage devices. If a failure occurs, consistency groups ensure that data is recovered from the secondary volumes will be consistent.

Each consistency group has a "consistency time" which is derived from the application system's time stamps. More particularly, the consistency time is a time that is always equal to or after every time stamp from a data write of that consistency group. In the XRC environment, the consistency time is the latest time to which the system guarantees that updates to the secondary volumes are consistent. As long as the application program is writing data to the primary volume, the data writes' time stamps increase, and so does the consistency time. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM and incorporated herein by reference in their entirety.

Consistency groups are formed within a "session." All volume pairs assigned to a session will have their updates maintained in the same consistency group. Thus, the sessions determine the volumes whose updates will form a consistency group. Consistency groups are formed within a journal. From the journal, updates from a consistency group are applied to the secondary volume. If the system fails while updates from the journal are being applied to a secondary volume, during recovery operations, the updates that did not complete writing to the secondary volume can be recovered from the journal and applied to the secondary volume.

In some data storage systems, consistency problems are possible if a database or data set spans multiple sessions. In these systems, consistency groups are not able to maintain consistency across sessions; in such systems, consistency groups are only formed within one session. This concern, namely allowing consistency across sessions or other groupings of storage areas, was addressed by U.S. patent application Ser. No. 09/422,595, entitled "Method, System, and Program For Maintaining Data Consistency Across Groups of Storage Areas," filed on Oct. 21, 1999 in the names of R. M. Kern et al., and assigned to IBM. The foregoing application is hereby incorporated herein by reference.

Although the approach of the foregoing application might be satisfactory for many applications, the present inventors are actively involved in researching possible improvements for products such as these. In this respect, one area of focus involves preserving consistency during backup operations. In this endeavor, the present inventors have recognized that status changes in one of the sessions can impede the ability of the other sessions to maintain mutual consistency. In particular, if one of the sessions is suspended (for example, with the XSUSPEND command), then this session is not processing any updates and also not incrementing its time of the last consistency group in the journal. Another situation arises when a complete set of consistent secondary devices is desired, for example, to capture a point in time backup of all of the volumes. In this case, the normal means of obtaining this condition in a single session is insufficient in the multiple session environment. Consequently, known multi-session data storage facilities may not be completely adequate for some applications due to certain unsolved consistency issues.

SUMMARY OF THE INVENTION

Broadly, the present invention concerns a multi-session data storage facility that coordinates similar status changes across all sessions at appropriate times. The data storage facility includes multiple sessions, each session having primary and secondary storage. In each session, a data mover implements data mirroring by copying updates from the primary storage to the secondary storage. A master data set, accessible by all sessions, includes a common area used by a master data mover to post "universal" commands applicable to all sessions. The master data set also includes individual session areas. Whenever a data mover receives a host-initiated command, this data mover becomes a "master," and the remaining data movers become "slaves" with respect to this command. The command is initially received along with a "start time," which may be immediate or some time in the future. Initially, the master data mover lists the command in the master data set's common area.

Whenever a slave data mover detects a command in the master data set's common area, it suspends the formation of consistency groups and responds by posting a "ready" message in the slave's session area. The "ready" message comprises the slave data mover's consistency form time (i.e., the earliest most-recent update time from all controllers in that session).

After posting the command, the master data mover reviews the slave data movers' responses. If these responses indicate all slave data movers are capable of executing the command in a consistent manner, then the master data mover instructs the slave data movers to execute the command. This is done by entering the command's start time in the master data set's common area. Otherwise, the master data mover enters a cancel instruction in the master data set's common area.

In addition to commands, errors may also be entered into the master data set. When an individual data mover detects an error in its own processing, it records the type of error and the time of day in its session area to advise other data movers that the error-initiating data mover is processing its error. The error-initiating session then begins to process the errors. When other data movers detect the error listing in the error-initiating data mover's session area, they proceed to process equivalent errors locally, such as by suspending data mirroring operations as appropriate. When the error is corrected, the error-initiating data mover resets the error handling indication in its session area to show that the error has been corrected.

The foregoing features may be implemented in a number of different forms. For example, the invention may be implemented to provide a method of distributing and locally processing commands and errors among multiple remote copy backup sessions of a data storage system. In another embodiment, the invention may be implemented to provide an apparatus, such as a data storage facility, configured to perform operations to distribute and locally process commands and errors among multiple remote copy backup sessions of a data storage system. In still another embodiment, the invention may be implemented to provide a signal-bearing medium tangibly embodying a program of machine-readable instructions executable by a digital data processing apparatus to perform such operations. Another embodiment concerns logic circuitry having multiple interconnected electrically conductive elements configured to perform the foregoing operations.

The invention affords its users with a number of distinct advantages. Chiefly, the invention maintains data consistency by coordinating the local processing of errors and commands among separate storage sessions. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Computing Environment

Figure 1A:
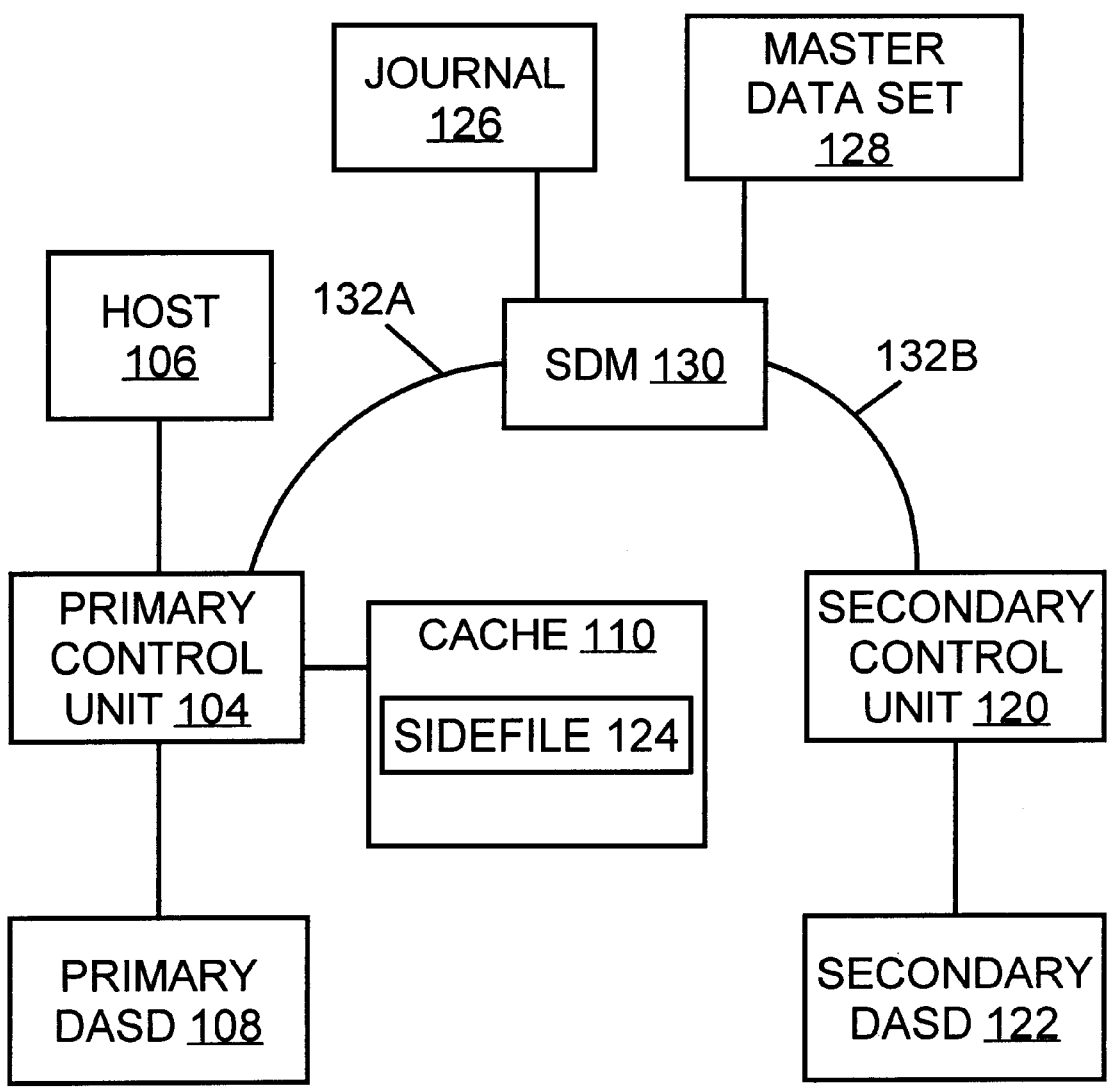
FIG. 1A is a block diagram of the hardware components and interconnections of a primary/secondary storage pair, according to the invention.

One aspect of the invention concerns a data storage system, which may be embodied by various hardware components and interconnections, with one example being described in FIG. 1A. A primary control unit 104 provides one or more host 106 computers access to a primary DASD 108. The primary control unit 104 has a primary cache 110 that maintains updates to tracks in the DASD 108 until destaged to the DASD 108. A secondary DASD 122 maintains back-up copies of some or all volumes of the DASD 108, under direction of a secondary control unit 120. A "volume pair" comprises a volume in the primary DASD 108 and the shadow of that volume in the secondary DASD 122 that maintains a back-up copy of the data at the primary volume in the volume pair. Thus, for each primary volume, there is a corresponding secondary volume with identical contents; this is a volume pair.

Updates to the primary DASD 108 are transferred to the secondary control unit 120 for storage in the secondary DASD 122 to assure that the secondary DASD 122 maintains a consistent and concurrent image of the primary DASD 108. The primary control unit 104 may further include a non-volatile storage unit (not shown), such as a battery-backed up. volatile memory, to maintain a non-volatile copy of data updates. Examples of the control units 104 and 120 include IBM 3990, Model 6 Storage Controllers, or other suitable control units known in the art.

A system data mover (SDM) 130, such as the system data mover program included in the IBM XRC system, communicates with the primary 104 and secondary 120 control units, and manages the transfer of updates to the secondary DASD 122. Thus, data is transferred between the primary 104 and secondary 120 control units via the system data mover 130. In preferred embodiments, the system data mover 130 and the control units 104 and 120 communicate via communication paths 132a, 132b, which may comprise direct high speed transmission lines, such as an Enterprise System Connection (ESCON) link. (ESCON is a registered trademark of IBM). However, the communication paths 132a, 132b may comprise other communication means known in the art, including network transmission lines, fiber optic lines, conductive busses, intelligent channels, wireless links, etc. The system data mover 130 software may be incorporated at the site of the primary control unit 104, the secondary control unit 120, or an independent site.

The primary control unit 104 initially writes data updates to a sidefile 124 in the cache 110. The system data mover 130 retrieves data updates from the sidefile 124 and writes them to a journal 126. Within the journal, updates are arranged into consistency groups. Consistency groups are formed for all updates to volumes that share a session. The consistency group contains records that have their order of update preserved, even across multiple storage controls. This preservation of order is important for applications that process dependent write input/output operations.

A master data set 128 maintains a list of the sessions being managed, and for each managed session, the time of the most recent update to a volume in that session. The master data set 128 may be implemented in various forms of shared memory, such as a common cache, table, physical device, logical device, etc. Master data set contents are described in greater detail below.

The journal data sets for a primary/secondary control unit pair may reside on any device, although illustrated in the context of the journal 126. Further details of the arrangement of the system data mover, journal data sets, primary and secondary control units, and DASDs are described in the IBM publication "Planning for IBM Remote Copy," IBM document SG24-2595-00 (Copyright IBM Corp., 1995), which publication is incorporated herein by reference in its entirety.

Multi-session System

Each primary/secondary control unit pair manages a fixed number of volumes. Thus, for mass storage applications that require a greater number of volumes, multiple sessions may be used concurrently. Furthermore, volumes from multiple primary/secondary control unit pairs may be included within a single session. Further, data sets may span sessions within a single primary/secondary control unit pair or across multiple primary/secondary control unit pairs.

Figure 1B:
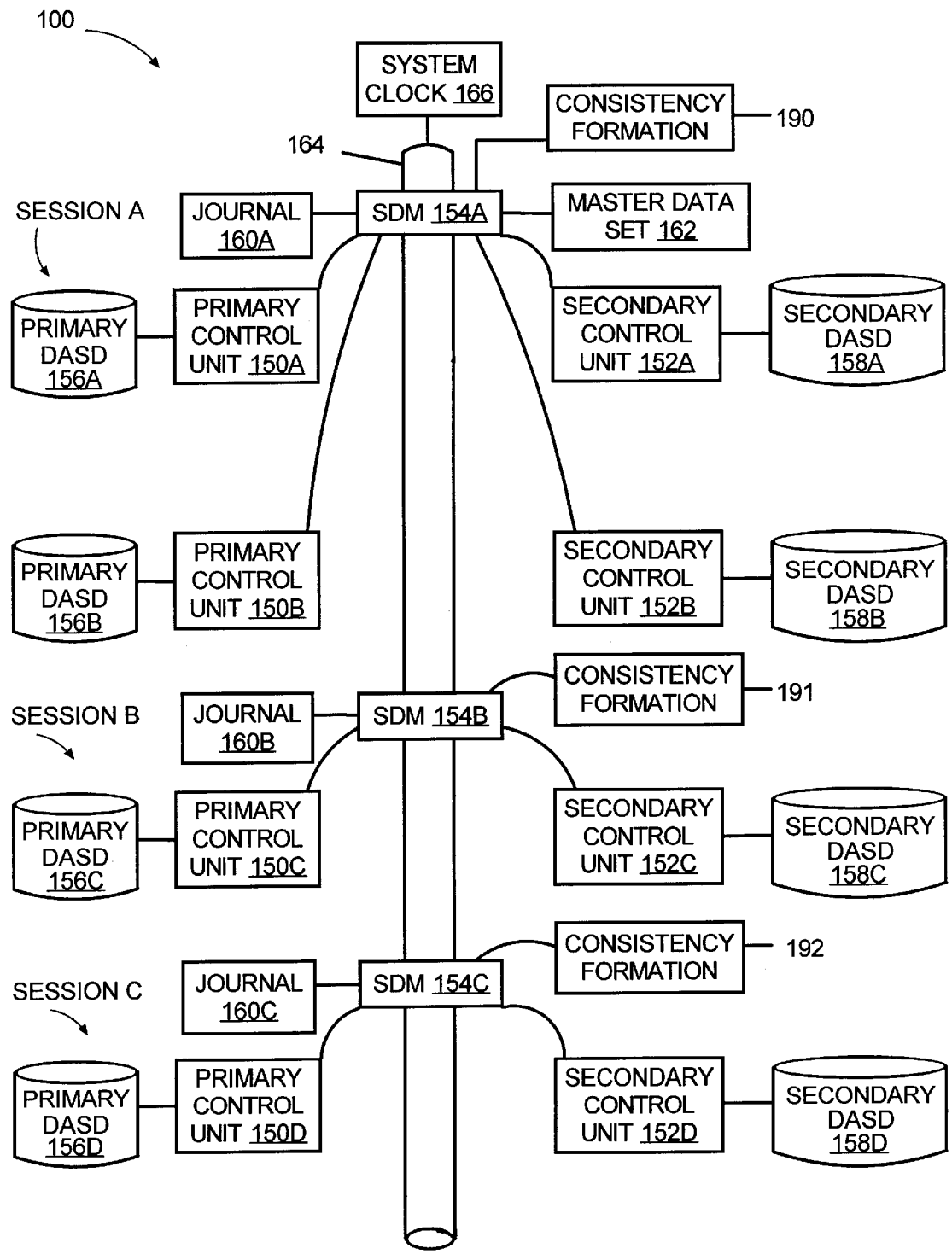
FIG. 1B is a block diagram of the hardware components and interconnections of a multi-session storage system, according to the invention.

Relatedly, FIG. 1B illustrates a multi-session system 100 comprising multiple instances of the primary and secondary storage controller system pairs interconnected to form a single mass storage space. The multi-session system 100 includes various components, including:

1. several primary/secondary pairs each including a primary control unit such as 150a–150d and a secondary control unit such as 152a–152d;
2. system data movers such as 154a–154c;
3. primary DASDs such as 156a–156d;
4. secondary DASDs 158a–158d;
5. journal data sets 160a–160c;
6. a master data set (MDS) 162; and
7. consistency formations, such as 190–192.

Each of the primary 150a–150d and secondary 152a–152d control units may have the architecture described with respect to FIG. 1A, as an example. A network 164 provides communication among the components and the data movers 154a–154c. Although shown separately, one or more of the data movers 154a, 154b, 154c may be implemented in other hardware of that session, such as a corresponding primary control unit, e.g. 150a–150d.

The foregoing components are arranged to form multiple sessions, including Sessions A, B, and C. The volume pairs in the primary and secondary DASDs 156a, 158a and 156b, 158b form the volumes of "Session A," the volume pairs in primary and secondary DASDs 156c, 158c form the volumes in "Session B," and the volume pairs in primary and secondary DASDs 156d, 158d form the volumes in "Session D." However, volumes in the multiple primary/secondary pairs can be arranged in any number of different sessions.

Thus, the mass storage space formed by the volumes in the DASDs 156a–156d and 158a–158d define three sessions A, B, and C. Data sets may span different sessions and span the volumes between primary/secondary control unit pairs. The master data set 162 includes a storage region for each session indicating among other things, the time the most recent update to a volume in that session was entered into the journal. For each session, the corresponding system data mover 154a–154c communicates any journaled changes (160a–160c) to the master data set 162 via the network 164.

A common system clock 166 provides the time stamps for updates to ensure that a common time is used across all primary/secondary pairs in the system 100. Thus, the system clock 166 provides a common time reference for application programs writing updates to volumes in the system 100 to ensure that updates are not shadowed out of sequence.

After updates are entered into a journal and included within a consistency group, updates within a consistency group are applied to the secondary volumes. This may be achieved in a manner already known in the art. The creation of consistency groups guarantees that the system will shadow data to a remote site in appropriate order to maintain sequence integrity for any type of data. If the session spans multiple primary/secondary control unit pairs, such as Session A, then the consistency group preserves the order of updates between primary control units 150a and 150b. Details of applying data from consistency groups is described in U.S. Pat. No. 5,734,818 entitled "Forming Consistency Groups Using Self-describing Record Sets for Remote Data Duplexing," assigned to IBM and incorporated herein by reference in its entirety. Using consistency groups helps ensure that updates applied to the secondary DASDs within a session are consistent as of the consistency time of the consistency group. If a failure occurs while updates are written from the journal to secondary volumes in the secondary DASD, then during recovery, the updates that were interrupted during system failure can be recovered from the journal and reapplied to the secondary volume. In this way, data is ensured consistent within each session during recovery as of a point in time, defined by the consistency group time for a session. To provide consistency across multiple sessions, techniques such as described in the above-cited U.S. patent application Ser. No. 09/422,595 may be used.

Consistency Formation Storage Regions

The consistency formations 190–192 are used by their respective data movers when forming consistency groups. Consistency groups may be formed according to known techniques, one example being described in the above-cited U.S. Pat. No. 5,734,818.

Master Data Set

TABLE 1, below, shows some exemplary contents of the master data set 162. As illustrated, the master data set 162 lists each session in the multi-session system 100, along with various statistics about activity in that session. The master data set 162 also lists various "common" statistics of the system 100 as a whole. For individual sessions, the statistics listed in the master data set 162 may include:

1. most-recent update time, defined as the time of the last update occurring to any volume in the session.
2. journal time, defined as a timestamp of a record stored in the journal, and signifies the latest time at which that data can be recovered.
3. consistency form time, defined as the earliest of all controller's most-recent update times.
4. secondary data consistency time, defined as timestamp of the data that was last written to the secondary data storage by any controller.
5. identification of any errors occurring on the session.
6. the state of this session's processing of any universal commands.
7. the state of this session's processing of this or any other session's errors.

TABLE 1

MASTER DATA SET

| MASTER DATA SET AREA | CONTENTS |
| --- | --- |
| common area ("system" or "master") | commands and/or errors applicable to all sessions, e.g., XSUSPEND command (and start time), XEND command (and start time) |
| session A | most-recent update time, journal time, consistency form time, secondary data consistency time, identification of any errors, command processing indications, error handling indications |
| session B | ... |
| session C | ... |

Exemplary Digital Data Processing Apparatus

Another aspect of the invention concerns a digital data processing apparatus, which may be used to implement any one of the system data movers 154a, 154b, 154c. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory (RAM), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

In addition to the various hardware embodiments described above, a different aspect of the invention concerns a method for coordinating remote copy status changes across multiple logical sessions to preserve consistency.

Signal-Bearing Media

Figure 2:
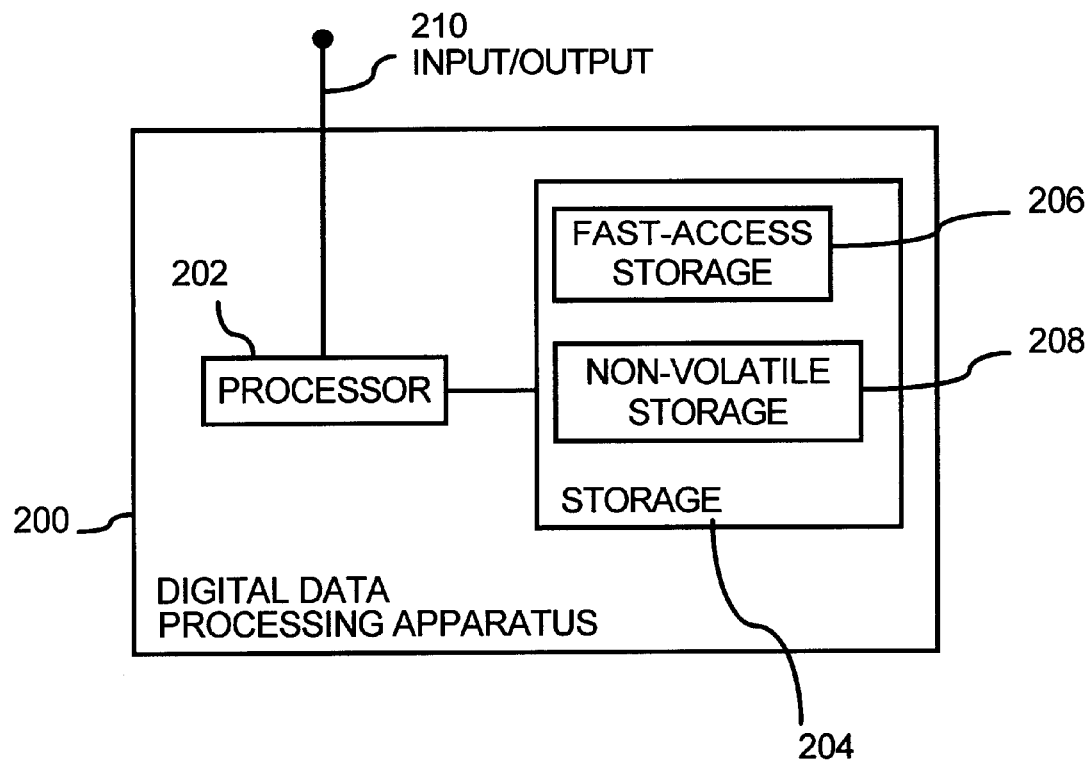
FIG. 2 is a block diagram of a digital data processing machine according to the invention.

In the context of FIGS. 1A–1B and 2, this method for coordinating remote copy status changes may be implemented, for example, by operating each system data mover, as embodied by digital data processing apparatuses 200, to execute a respective sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to coordinate remote copy status changes across multiple logical sessions to preserve consistency.

Figure 3:
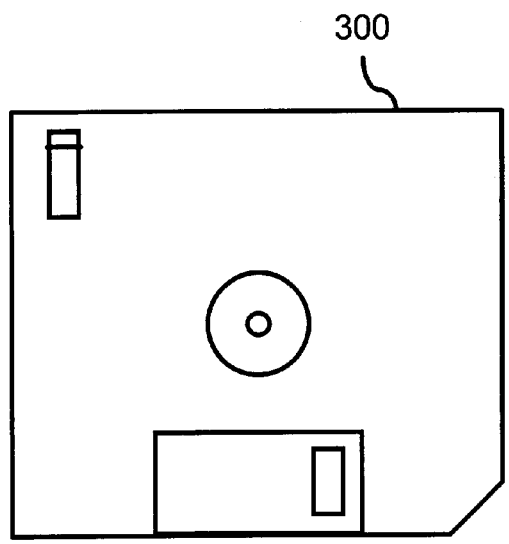
FIG. 3 shows an exemplary signal-bearing medium according to the invention.

This signal-bearing media may comprise, for example, RAM (not shown) contained within the system data mover, as represented by the fast-access storage 208. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks (RAID), or another DASD), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the system data mover, and is configured to perform operations to implement the method of the invention. The logic circuitry may be implemented using many different types of circuitry, as discussed above.

Initiating Commands

Figure 4:
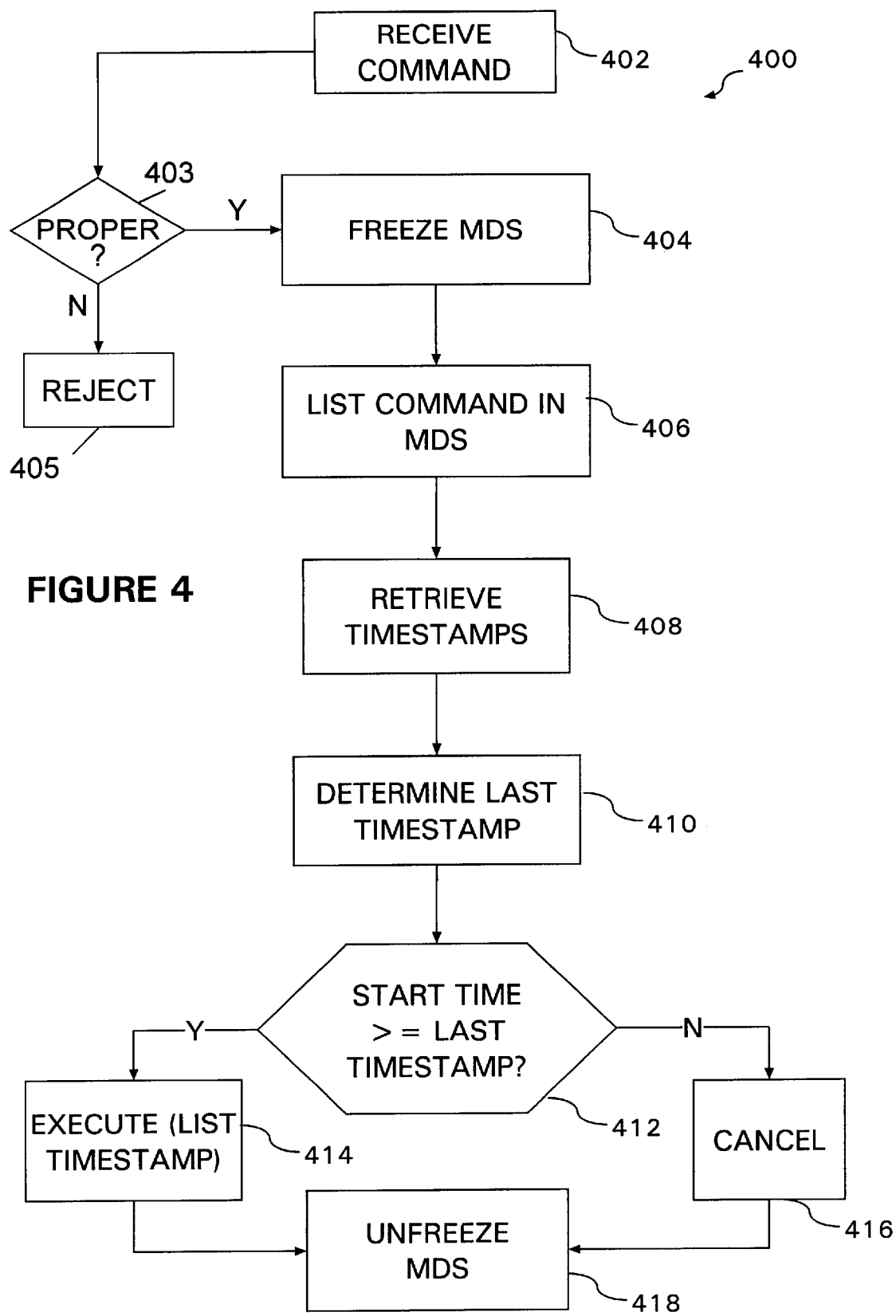
FIG. 4 is a flowchart of an operational sequence for a master data mover to initiate a universal command for performance by other slave sessions, according to the invention.

FIG. 4 shows a sequence 400 by which a master data mover submits a universal command for performance by all sessions, according to the invention. For ease of explanation, but without any intended limitation, the example of FIG. 4 is described in the context of the system 100 described above. The steps are initiated in step 402, when one of the sessions receives a command request from a "host initiator." This command request is called the "current" command request. The command request includes a command accompanied by a designated "start time," which is a scheduled time for the slave sessions to begin performing the command. The start time may be immediate, in which case the effective start time is the host initiator's time of submitting the command. Or, the start time may be some time in the future, in which case the effective start time is that future time. The host initiator may comprise a physically separate host machine (such as 106, FIG. 1A), for example. The command may be received, for example, by a primary control unit, data mover, or even separate hardware (not shown) of the receiving session. The data mover of the receiving session is called the "master" data mover for that command. In response to the command, the master data mover examines the current command to determine whether it is proper (step 403). For example, the command may be improper if it does not appear on recognized commands, fails to include proper syntax adversely affects the status of any individual session, etc. If the current command is improper, the master data mover returns a rejection message to the host initiator (step 405).

If the current command is proper, the master data mover proceeds by preventing any changes to the master data set 162 (step 404). This is called "freezing" or "suspending" the master data set. After step 404, the master data mover posts the current command in the common area of the master data set 162 (step 406), for execution by the slave data movers as discussed below. Next, the master data mover queries the slave data movers to return consistency timestamps (step 408). Each consistency timestamp represents the past time to which data in that session is recoverable. In step 410, the master data mover identifies the most recent one of these returned consistency timestamps from step 408.

Next, the master data mover determines whether the start time from step 402 is at or after the last timestamp from step 410. If so, this means that the requested time can be reached in a consistent manner; in this case, the master data mover lists an "execute instruction" in the common area of the master data set 162 (step 414). The execute instruction, for example, may comprise entry of the start time. Otherwise, if the start time from step 402 occurs before the last timestamp from step 410, this means that the requested time cannot be reached in a consistent manner; accordingly, the master data mover lists a "cancel" instruction in the master data set 162 (step 416).

After either steps 414 or 416, the master data mover unfreezes the master data set 162 (step 418). The foregoing sequence is repeated by each data mover when that data mover receives a host-initiated command and thereby becomes the master data mover for that command.

As an alternative to step 412, if no time is specified in step 402, the master data mover may progress to step 414. This alternative is possible because in that case the latest timestamp is requested, and thus no session's timestamp can be even later. In other words, one or more of the sessions have already applied updates with timestamps after the requested start time, and the command therefore cannot be executed in a consistent manner.

Initiating Error Processing

Figure 5:
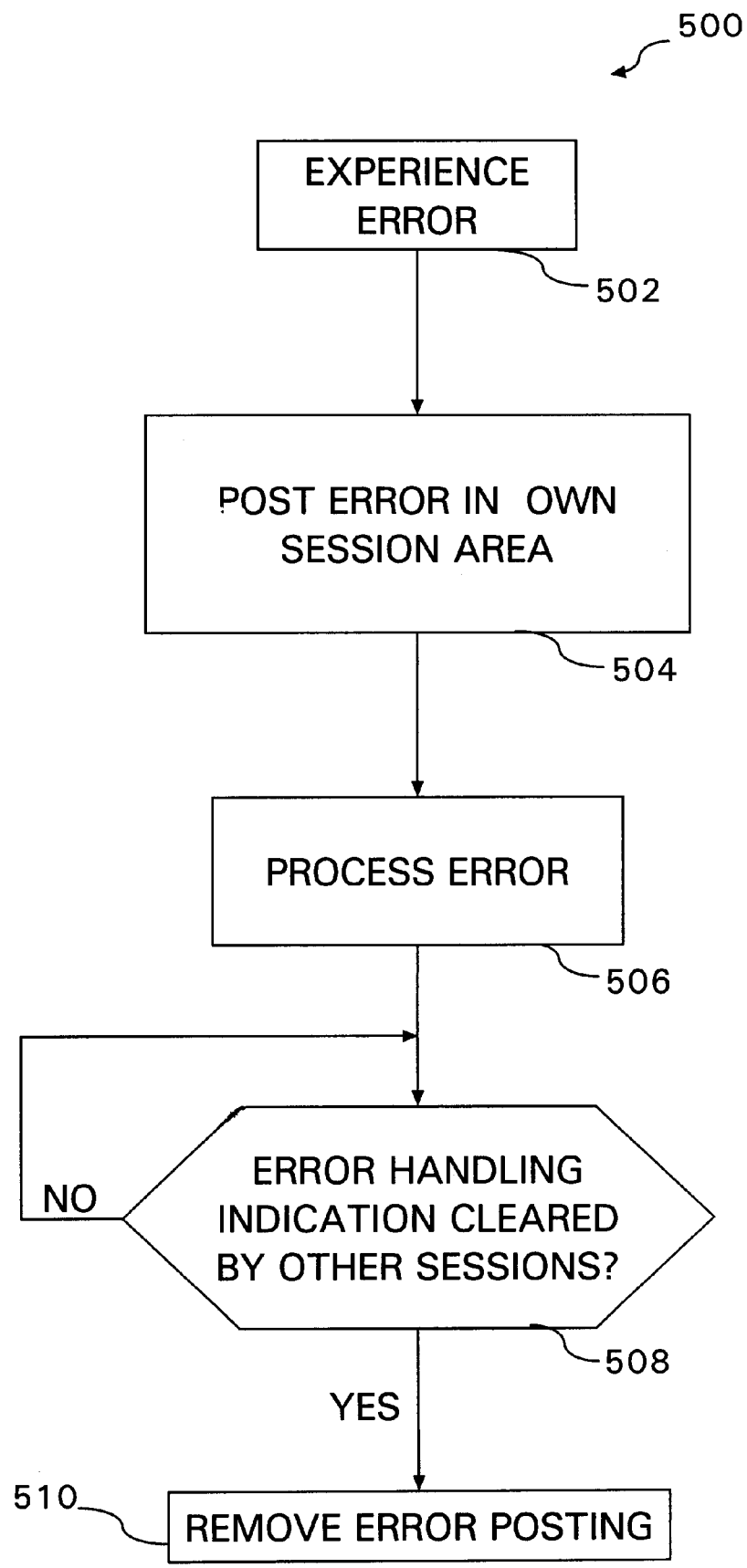
FIG. 5 is a flowchart of an operational sequence performed by a session when it experiences an error, according to the invention.

FIG. 5 shows an operational sequence 500 that is performed when a session experiences an error, triggering other sessions to process equivalent errors locally. For ease of explanation, but without any intended limitation, the example of FIG. 5 is described in the context of the system 100 described above. The steps are initiated in step 502, when one of the sessions experiences an error. This session is referred to as the "error-initiating" session, and its data mover acts as a master data mover with respect to the other, non-error-initiating sessions.

In response to step 502, the error-initiating session posts the error in its respective session area of the master data set 162 (step 504). Step 504 may include, for example, posting an identification of the type of error, along with a time that the error occurred. In step 506, the error-initiating session takes measures to process the error, which may include changing to a suspended state to stop updates to secondary storage, while continuing to journal and update the primary storage. As an alternative to the illustrated description, step 506 may be performed before or concurrently with step 504.

After step 506, the error-initiating session determines whether the other sessions are still processing the error locally at step 508. Namely, when the other sessions start processing the error locally, they post an error handling indication in their session area; upon completion, a session removes its error handling indication. When all other sessions have signaled successful processing of the error, the error-initiating session removes its posting of the error (step 510), completing the sequence 500.

Processing Errors/Commands Among Multiple Concurrent Sessions

Figure 6:
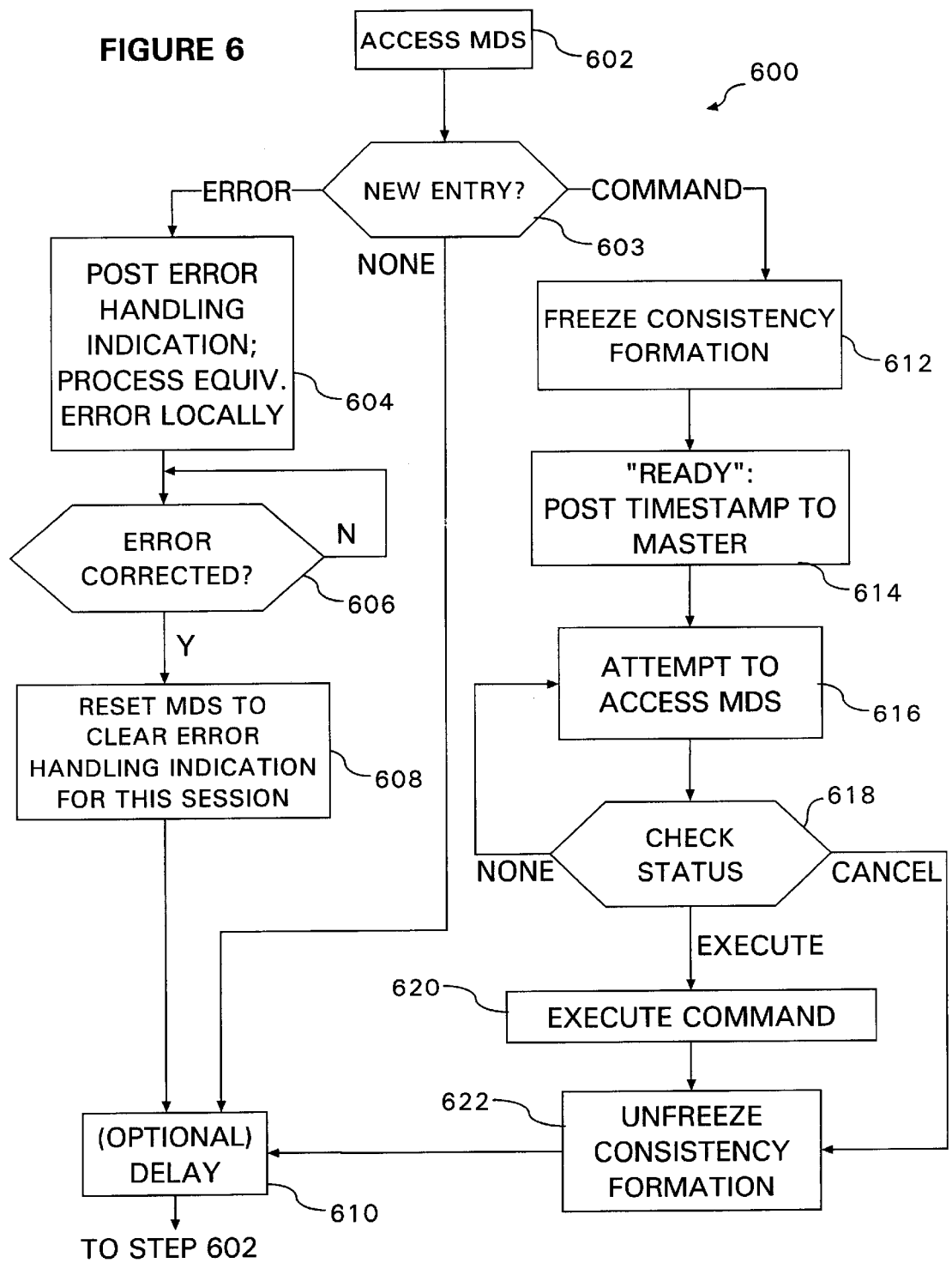
FIG. 6 is a flowchart of an operational sequence performed by slave data movers to respond to errors and commands, thereby synchronizing operations among concurrent sessions according to the invention.

FIG. 6 shows a sequence 600 that is performed repeatedly by each data mover to process commands and errors initiated by other data movers. The sequence 600 synchronizes errors and commands among different concurrent sessions. In contrast to FIGS. 4–5, each data mover performing the sequence 600 acts as a "slave" data mover.

For ease of explanation, but without any intended limitation, the example of FIG. 6 is described in the context of the system 100 described above. The sequence 600 is discussed in the context of an illustrative, "slave" data mover. The steps are initiated in step 602, when the slave data mover accesses the master data set 162. Namely, the slave data mover reads the common area and all session areas of the master data set. In step 603, the slave data mover determines whether there are any new entries appearing in the master data set 162, whether in the common area or in any data mover's session area. "Entries" comprise errors (which appear in the session areas) and commands (which appear in the common area).

If step 603 detects posting of a new error, the slave data mover proceeds to process the error as follows. First, the slave data mover makes a representative "error handling" entry in the data mover's session area of the master data set to show that the current error is being processed (step 604).

This entry may be made, for example, by recording the time of day in this data mover's session area of the master data set; this signals to other data movers that this error is being processed. Also in step 604, the slave data mover processes an equivalent error locally. This involves the slave data mover changing to a suspended state to stop updates to its secondary storage, while continuing to journal and update the primary storage.

Next, the slave data mover waits for correction of the error (step 606). As an example, the error may be corrected by hardware technicians, by a system administrator, software programming, or another source. In response, the slave data mover proceeds to step 608, where it exits its suspended state (entered in step 604) and also updates its session area of the master data set 162 to clear the error handling indication previously entered in step 604.

Following step 608, the slave data mover may institute an optional delay (step 610), before returning to step 602. As an example, this delay may be introduced for the purpose of ensuring that the master data set is accessed (step 602) on a specific time schedule, such as four times per second.

In contrast to the foregoing description, if step 603 detects a new command rather than an error, the routine 600 proceeds to step 612. Here, the slave data mover freezes the consistency formation, thereby stopping that data mover's process of forming consistency groups. This is necessary because the consistency formation time must not change between its reporting to the command initiator (discussed below in step 614) and its use in the master data mover's analysis of all slave data movers' timestamps (step 410, FIG. 4). Such a change would invalidate the result of step 410. After step 612, the slave data mover reports the consistency form time to the command initiator by making a representative entry in the slave's session area of the master data set (step 614). This entry is made for the purpose of providing a time for the master data mover's calculation of step 410.

After step 614, the slave data mover attempts to access the common area of the master data set 162 to determine how to further process the current command (step 616). If the master data set 162 contains a start time in the common area in association with the current command, this time arose from step 414 (FIG. 4) and indicates that the command is to be processed at that respective start time. In this case, step 618 advances to step 620, where the slave data mover executes the current command. Following step 620, the slave data mover unfreezes the consistency formation (step 622), thereby resuming the formation of consistency groups.

On the other hand, if the master data set 162 contains a "cancel" instruction, this cancel instruction arose from step 416 and indicates that time-consistent command processing is not possible. In this case, step 618 proceeds straight to step 622, discussed above.

Following step 622, the slave data mover proceeds to step 610, to optionally institute a delay before returning to step 602.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for coordinating operations among multiple remote copy backup sessions of a data storage system, where each session includes a primary storage subsystem and a corresponding backup storage subsystem, where the data storage system includes a master data set with individual areas corresponding to each session and a common area corresponding to all sessions, the method comprising the operations of:

a first one of the sessions receiving a command request from a host, including a command and a start time;

in response to the command request, the first session performing operations comprising:
disallowing changes to the master data set;
storing the command in the common area;
retrieving time stamps from the sessions, each time stamp representing a past time to which data in that session can be recovered;
determining a most recent one of the returned time stamps, and
if the command's start time is after the most recent returned time stamp, listing the command and the most recent time stamp in the common area of the master data set;
if the command's start time is before the most recent returned time stamp, listing a cancel instruction in the common area of the master data set;
re-allowing changes to the master data set.

2. The method of claim 1, further comprising rejecting the command request if it fails to satisfy prescribed criteria.

3. The method of claim 1, further including processing entries in the common area of the master data set, comprising the following sequence repeatedly performed by each session:
a first session accessing other sessions' areas of the master data set;
in response to appearance of an error therein,
the first session of locally processing the error and;
responsive to correction of the error, the first session entering an error-corrected indication in the first session's area of the master data set.

4. The method of claim 1, further including processing entries in the common area of the master data set, comprising the following sequence repeatedly performed by each session:
a first session accessing the common area of the master data set;
in response to appearance of an error in the common area, the first session locally processing the error and;
responsive to correction of the error, the first session entering an error-corrected indication in the first session's area of the master data set.

5. The method of claim 1, further including processing entries in the common area of the master data set, comprising the following sequence repeatedly performed by each session:
in response to a first session detecting appearance of a command in the common area of the master data set, the first session suspending formation of consistency groups;
the first session entering a consistency form time in the first session's area of the master data set;
the first session accessing the common area of the master data set, and responsive to appearance of an execute instruction, executing the command;
responsive to appearance of a cancel instruction, foregoing execution of the command and;
the first session resuming formation of consistency groups.

6. The method of claim 5, the operation of entering a consistency form time in the first session's area of the master data set comprising:
determining a most-recent update time for each controller in the first session;
identifying an earliest one of the most-recent update time and;
entering the earliest most-recent update time in the first session's area of the master data set.

7. The method of claim 5, the execute instruction comprising a start time for the command.

8. A method for coordinating operations in a data storage system with multiple remote copy backup sessions each supervised by a different data mover, where each session includes a primary storage subsystem and a corresponding backup storage subsystem, where the data storage system includes a master data set with individual areas corresponding to each session and a common area corresponding to all sessions, the method comprising the following operations performed by each individual session:
determining whether the master data set contains any new entries;
responsive to determining that the master data set contains a new entry;
if the new entry is an error,
locally processing the error in the individual session;
after correction of the error, entering an error-corrected indication in the master data set in association with the individual session;
if the new entry is a command contained in the common area,
suspending formation of consistency groups in the individual session;
determining a most-recent update time for each controller in the individual session, and identifying an earliest one of the most-recent update times;
accessing the common area of the master data set to determine whether the command has associated therewith an execute or a cancel instruction, and only if the command is associated with an execute instruction, the individual session locally executing the command and;
resuming the formation of consistency groups in the individual session.

9. A data storage medium tangibly embodying a program of machine-readable instructions executable by a digital data processing machine to perform operations to coordinate operations among multiple remote copy backup sessions of a data storage system, where each session includes a primary storage subsystem and a corresponding backup storage subsystem, where the data storage system includes a master data set with individual areas corresponding to each session and a common area corresponding to all sessions, the operations being performed by a session and comprising:
a first one of the sessions receiving a command request from a host, including a command and a start time;
in response to the command request, the first session performing operations comprising:
disallowing changes to the master data set;
storing the command in the common area;
retrieving time stamps from the sessions, each time stamp representing time to which data in that session can be recovered;
determining a most recent one of the returned time stamps, and
if the command's start time is after the most recent returned time stamp, listing the command and the most recent time stamp in the common area of the master data set;
if the command's start time is before the most recent returned time stamp, listing a. cancel instruction in the common area of the master data set;
re-allowing changes to the master data set.

10. The medium of claim 9, the operations further comprising rejecting the command request if it fails to satisfy prescribed criteria.

11. The medium of claim 9, the operations further including repeatedly processing entries in the master data set, comprising:
a first session accessing other sessions' areas of the master data set;
in response to appearance of an error therein,
the first session locally processing the error and;
responsive to correction of the error, the first session entering an error-corrected indication in the first session's area of the master data set.

12. The medium of claim 9, the operations further including repeatedly processing entries in the master data set, comprising:
a first session accessing the common area of the master data set;
in response to appearance of an error in the common area, the first session locally processing the error and;
responsive to correction of the error, the first session entering an error-corrected indication in the first session's area of the master data set.

13. The medium of claim 9, the operations further including repeatedly processing entries in the master data set, comprising:
in response to a first session detecting appearance of a command in the common area of the master data set,
the first session suspending formation of consistency groups;
the first session entering a consistency form time in the first session's area of the master data set;
the first session accessing the common area of the master data set, and responsive to appearance of an execute instruction, executing the command;
responsive to appearance of a cancel instruction, foregoing execution of the command and;
the first session resuming formation of consistency groups.

14. The medium of claim 13, the operation of entering a consistency form time in the first session's area of the master data set comprising:
determining a most-recent update time for each controller in the first session;
identifying an earliest one of the most-recent update times and;
entering the earliest most-recent update time in the first session's area of the master data set.

15. The medium of claim 13, the execute instruction comprising a start time for the command.

16. A data storage medium tangibly embodying a program of machine-readable instructions executable by a digital data processing machine to perform operations to coordinate operations in a data storage system including multiple remote copy backup sessions where each session includes a primary storage subsystem and a corresponding backup storage subsystem, multiple data movers, each remote copy backup session being supervised by one of the data movers, a master data set with individual areas corresponding to each session and a common area corresponding to all sessions, the operations being performed by each individual session:

determining whether the master data set contains any new entries;

responsive to determining that the master data set contains a new entry, if the new entry is an error, locally processing the error in the individual session;

after correction of the error, entering an error-corrected indication in the master data set in association with the individual session;

if the new entry is a command contained in the common area, suspending formation of consistency groups in the individual session;

determining a most-recent update time for each controller in the individual session, and identifying an earliest one of the most-recent update times;

accessing the common area of the master data set to determine whether the command has associated therewith an execute or cancel instruction, and only if the command is associated with an execute instruction, the individual session locally executing the command and;

resuming the formation of consistency groups in the individual session.

17. A data storage system, comprising:

multiple remote copy backup sessions, each session including a primary storage subsystem and a corresponding backup storage subsystem;

a master data set with session areas each corresponding to an individual session and a common area corresponding to all sessions;

where the sessions are programmed to coordinate operations among the sessions by each session performing operations comprising:

receiving a command request from a host, including a command and a start time;

in response to the command request, the session performing operations comprising:

disallowing changes to the master data set;

storing the command in the common area;

retrieving time stamps from the sessions, each time stamp representing time to which data in that session can be recovered;

determining a most recent one of the returned time stamps, and if the command's start time is after the most recent returned time stamp, listing the command and the most recent time stamp in the common area of the master data set;

if the command's start time is before the most recent returned time stamp, listing a cancel instruction in the common area of the master data set and;

re-allowing changes to the master data set.

18. The system of claim 17, the operations further comprising rejecting the command request if it fails to satisfy prescribed criteria.

19. The system of claim 17, each session being further programmed to repeatedly perform operations to process entries in the master data set, the operations comprising:

accessing other sessions' areas of the master data set;

in response to appearance of an error therein, the session locally processing the error and;

responsive to correction of the error, the session entering an error-corrected indication in the session's area of the master data set.

20. The system of claim 17, each session being further programmed to repeatedly perform operations to process entries in the master data set, the operations comprising:

accessing the common area of the master data set;

in response to appearance of an error in the common area, the session locally processing the error and;

responsive to correction of the error, the session entering an error-corrected indication in the session's area of the master data set.

21. The system of claim 17, each session being further programmed to repeatedly perform operations to process entries in the master data set, the operations comprising:

in response to the session detecting appearance of a command in the common area of the master data set, suspending formation of consistency groups at the session;

entering a consistency form time in the session's area of the master data set;

accessing the common area of the master data set, and responsive to appearance of an execute instruction, executing the command;

responsive to appearance of a cancel instruction, foregoing execution of the commands and;

re-allowing changes to the consistency formation.

22. The system of claim 21, each session being programmed such that the operation of entering a consistency form time in the first session's area of the master data set comprising:

determining a most-recent update time for each controller in the first session;

identifying an earliest one of the most-recent update times and;

entering the earliest most-recent update time in the first session's area of the master data set.

23. The system of claim 21, the execute instruction comprising a start time for the command.

24. A data storage system, comprising:

multiple remote copy backup sessions, each session including a primary storage subsystem and a corresponding backup storage subsystem;

multiple data movers, each remote copy backup session being supervised by one of the data movers;

a master data set with session areas each corresponding to an individual session and a common area corresponding to all sessions;

where the sessions are programmed to coordinate operations among the sessions by each individual session performing operations comprising:

determining whether the master data set contains any new entries;

responsive to determining that the master data set contains a new entry, if the new entry is an error, locally processing the error in the individual session;

after correction of the error, entering an error-corrected indication in the master data set in association with the individual session;

if the new entry is a command contained in the common area,
- suspending formation of consistency groups in the individual session;
- determining a most-recent update time for each controller in the individual session, and identifying an earliest one of the most-recent update times;
- accessing the common area of the master data set to determine whether the command has associated therewith an execute or cancel instruction, and only if the command is associated with an execute instruction, the individual session locally executing the command and;

resuming the formation of consistency groups in the individual session.

* * * * *

UNITED STATES PATENT AND TRADEMARK OFFICE
CERTIFICATE OF CORRECTION

PATENT NO.     : 6,484,187 B1
DATED          : November 19, 2002
INVENTOR(S)    : Ronald Maynard Kern et al.

It is certified that error appears in the above-identified patent and that said Letters Patent is hereby corrected as shown below:

<u>Column 13,</u>
Line 12, delete "time" and replace with -- times --.

<u>Column 14,</u>
Line 12, delete the period "." between "a" and "cancel".

Signed and Sealed this

Twenty-fifth Day of March, 2003

JAMES E. ROGAN
*Director of the United States Patent and Trademark Office*